Figure 1:
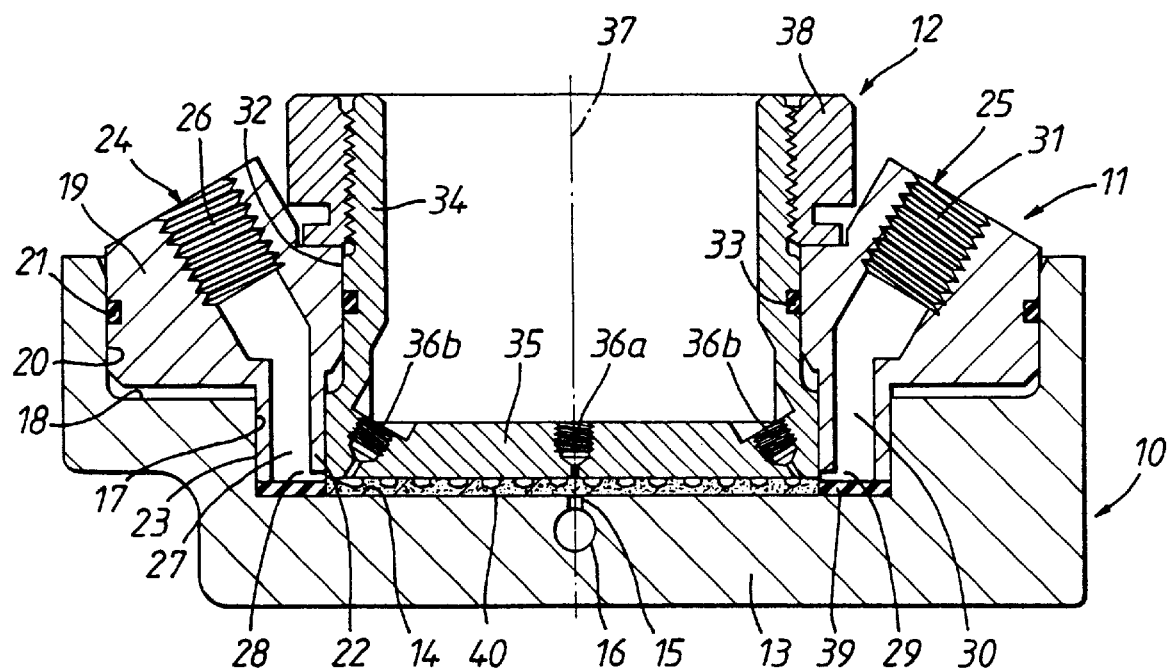

United States Patent [19]
Ball et al.

[11] Patent Number: 5,914,042
[45] Date of Patent: Jun. 22, 1999

[54] DEVICE AND METHOD FOR SEPARATING PLASMA FROM A BLOOD PRODUCT

[75] Inventors: Peter R. Ball, Langrish; Christopher C. Hall, Havant; Eileen M. A. Boulter, Portsmouth, all of United Kingdom

[73] Assignee: Pall Corporation, East Hills, N.Y.

[21] Appl. No.: 08/557,044

[22] PCT Filed: Jun. 10, 1994

[86] PCT No.: PCT/GB94/01256

§ 371 Date: Apr. 8, 1996

§ 102(e) Date: Apr. 8, 1996

[87] PCT Pub. No.: WO94/29008

PCT Pub. Date: Dec. 22, 1994

[30] Foreign Application Priority Data

Jun. 10, 1993 [GB] United Kingdom .................. 9311988

[51] Int. Cl.$^6$ .......................... B01D 61/14; B01D 61/18; B01D 63/08; A61M 1/34

[52] U.S. Cl. .............. 210/650; 210/321.75; 210/321.84; 210/422; 210/435; 210/651

[58] Field of Search ................... 210/650, 651, 210/767, 422, 435, 450, 451, 483, 488, 496, 929, 321.72, 321.75, 321.84

[56] References Cited

U.S. PATENT DOCUMENTS

| | | | |
|---|---|---|---|
| 3,705,100 | 12/1972 | Blatt et al. | |
| 4,212,742 | 7/1980 | Solomon et al. | 210/456 |
| 4,308,145 | 12/1981 | Higley et al. | 210/646 |
| 4,340,479 | 7/1982 | Pall | 210/490 |
| 4,381,775 | 5/1983 | Nosé et al. | 604/6 |
| 4,411,792 | 10/1983 | Babb | 210/651 |
| 4,604,208 | 8/1986 | Chu et al. | 210/650 |
| 4,619,639 | 10/1986 | Nosé et al. | 604/6 |
| 4,696,748 | 9/1987 | Nitadori et al. | 210/636 |
| 4,698,157 | 10/1987 | Gillot | 210/496 |
| 4,845,132 | 7/1989 | Masuoka et al. | 210/490 |
| 4,933,092 | 6/1990 | Aunet et al. | 210/729 |
| 5,217,627 | 6/1993 | Pall et al. | 210/767 |

FOREIGN PATENT DOCUMENTS

| | | |
|---|---|---|
| 1158988 | 12/1983 | Canada . |
| 0100285 | 2/1984 | European Pat. Off. . |
| 0111423 | 6/1984 | European Pat. Off. . |
| 0283663 | 9/1988 | European Pat. Off. . |
| 0336483 | 10/1989 | European Pat. Off. . |
| 0420765 | 4/1991 | European Pat. Off. . |
| 0464707 | 1/1992 | European Pat. Off. . |
| 56-34352 | 4/1981 | Japan . |
| 1442754 | 7/1976 | United Kingdom . |
| 2037614 | 7/1980 | United Kingdom . |
| 7901121 | 12/1979 | WIPO . |
| 8904197 | 5/1989 | WIPO . |
| 9102555 | 3/1991 | WIPO . |
| 9207656 | 5/1992 | WIPO . |
| 9308904 | 5/1993 | WIPO . |

OTHER PUBLICATIONS

Van Oudheusden, A.P.M., et al, "A Multilayer Membrane . . . Primary Health Care", Ann. Clin. Biochem., vol. 28, 1991, pp. 55–59.

Wiltbank, T.B., et al, "Filtration Plasmapheresis in Vivo", Transfusion, vol. 21, No. 5, Sep./Oct. 1981, pp. 502–510.

Beaudoin, G. et al, "Plasma Filtration in Couette Flow Membrane Devices", Artificial Organs, vol. 13, No. 1, 1989, pp. 43–51.

Primary Examiner—John Kim
Attorney, Agent, or Firm—Leydig, Voit & Mayer

[57] ABSTRACT

Plasma is separated from a blood product such as SAG-M or anticoagulated whole blood by flowing the blood product across a membrane. The membrane has a voids volume of greater than 50%, a pore size of less then 0.65 μm and a plasma flow rate of greater than 0.04 ml/min.cm$^2$ with a specified value of blood product and with a specified transmembrane pressure. The surface of the membrane contacted by the blood product has a smoothness of less than 0.5 μm.

62 Claims, 4 Drawing Sheets

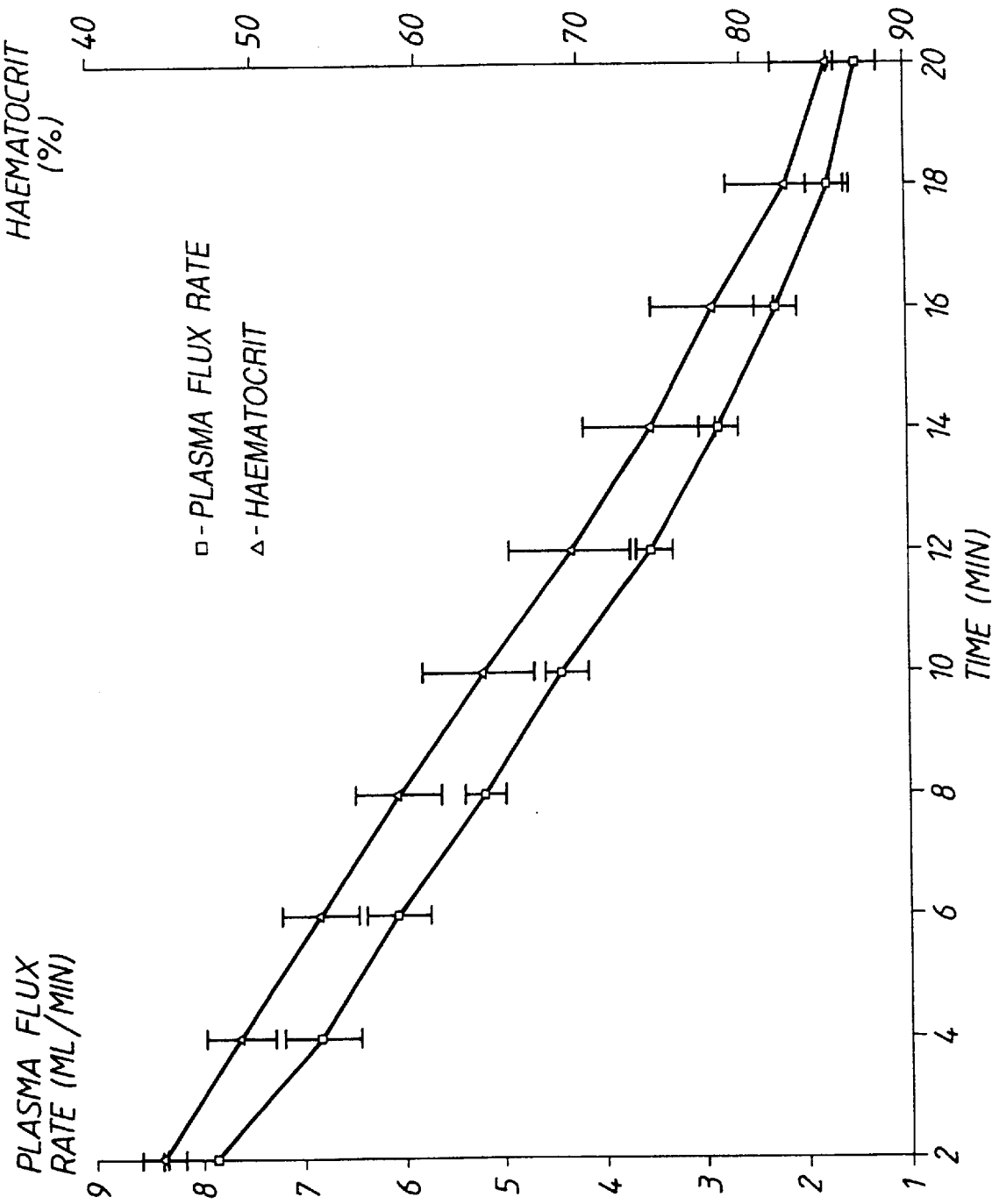

DEVICE AND METHOD FOR SEPARATING PLASMA FROM A BLOOD PRODUCT

This application is a 371 of PCT/GB94/01256 filed Jun. 10, 1994.

The invention relates to a device and method for separating blood cells from plasma or from another fluid in which cells are suspended.

An adult human contains about 5 liters of blood, of which red blood cells, also referred to as erythrocytes, account for about 45% of the volume, white cells about 1% and the balance being liquid blood plasma in which the cells are suspended. Blood also contains large numbers of platelets suspended in the plasma (their proportional volume is small). In view of the substantial therapeutic and monetary value of blood components, such as red blood cells, platelets and plasma, a variety of techniques have been developed to separate blood into its component fractions or to separate combinations of such components while ensuring maximum purity and recovery of each of the components.

Throughout this specification the term blood product will be used to refer to anticoagulated whole blood or suspensions of red blood cells (with or without other blood cell types) in a suitable fluid such as plasma or SAG-M (whose composition is detailed below).

In general, such separations have been achieved by centrifugation techniques. This requires, however, significant handling of the blood product, which can increase the risk of disease transmission. In addition, centrifuging also takes significant time.

An alternative to centrifugation for the separation of red blood cells, white blood cells and platelets from plasma or another fluid in which the cells are suspended is filtration. This can be achieved by flowing a blood product across a surface of a membrane whereupon plasma or another cell suspending fluid passes through the membrane under a pressure gradient generated across the membrane. This process is hereinafter referred to as cross-flow filtration. It has been found, however, that the filtration efficiency of such a membrane drops because the membrane pores become blocked with blood cells and cell fragment debris during filtration. Blocking cells and debris may not be effectively removed by cross-flow of the blood product across the surface of the membrane. As a result, the membranes previously used for such filtration have blocked before the haemocrit (the percentage of red blood cells in the suspending fluid) reaches a desired figure, for example 70% by volume.

In EP-A-464707, this problem is sought to be overcome by a shearing force induced at the membrane surface by forming the membrane as a cylinder and rotating it within a non-rotating outer cylinder whose walls are in close proximity to the rotating membrane. This process generates so-called "Taylor Vortices" which are intended to clear the membrane surface of clogging cells and debris and to provide increased trans-membrane pressure to increase plasma flow across the membrane.

A similar proposal for overcoming this problem is made by Beaudoin and Jaffrin in the article "Plasma Filtration in Couette Flow Membrane Devices" in the Journal "Artificial Organs" Volume 13 No. 1 1989 pages 43–51.

EP-A-0111423 endeavours to induce vortices in the flow using dimples formed on the surface of the membrane.

These approaches suffer from certain technical limitations. The proposal of EP-A-0111423 requires very precise alignment of the "dimples". Failure to achieve this will degrade the effectiveness of the device. The approaches of Beaudoin and Jaffrin and EP-A2-464707 require accurate alignment of the rotating and non-rotating cylinders and additionally require an electric motor to rotate the rotating cylinder which increases the expense and complexity of the device.

In all these proposals for plasma separation by filtration, it is essential that there is no or no significant lysis of erythrocytes in the blood product, since this releases haemoglobin. Since this is a protein, it can pass freely across the membrane with the other non-cellular components of the blood. Free haemoglobin (i.e. haemoglobin not contained within the erythrocyte cell membrane) is potentially undesirable, especially where the plasma is required for therapeutic purposes. Additionally, erythrocyte lysis produces cell fragments which can block the membrane pores.

Such lysis can be avoided or mitigated by the use of membranes with very small pore sizes ($\leq 0.1$ μm) i.e. considerably smaller than is required simply to prevent erythrocytes crossing the membrane. However, such membranes currently in use do not allow flow rates of plasma across the membrane that are sufficiently high to make separation of plasma by filtration a viable option—particularly when compared to centrifuging.

According to a first aspect of the invention, there is provided a device for treating a blood product comprising red blood cells suspended in a fluid whereby to separate the fluid from the cells, the device having an inlet for the blood product, an outlet for the separated fluid with a membrane disposed between the blood product inlet and the fluid outlet, the membrane having a voids volume of at least 50% and a surface having a smoothness (as herein defined) of less than 0.5 μm.

According to a second aspect of the invention, there is provided a device for treating a blood product comprising red blood cells suspended in a fluid whereby to separate the fluid from the cells, the device comprising a housing having an inlet for the blood product, an outlet for fluid depleted cells, an outlet for fluid and a membrane disposed in the housing separating the fluid outlet from the blood product inlet and the fluid depleted cell outlet so that blood product flows across a surface of said membrane becoming fluid depleted, the membrane having a pore size of less than 0.65 μm, and wherein the volume of fluid separated over 15 minutes is greater than 0.6 ml per unit area in $cm^2$ of the said surface when the device is used to treat a volume corresponding to 3.75 ml per unit area in $cm^2$ of the said surface of red blood cells suspended in SAG-M solution at a haematocrit of 45%, and when the transmembrane pressure difference is 35 mbar, the said membrane surface having a smoothness (as herein defined) of less than 0.5 μm.

According to a third aspect of the invention, there is provided a method of treating a blood product comprising red blood cells suspended in a fluid whereby to separate the fluid from the cells comprising filtering the blood product with a membrane, the membrane having a voids volume of at least 50% and a surface with a smoothness (as herein defined) of less than 0.5 μm.

According to a fourth aspect of the invention, there is provided a method of treating a blood product comprising red blood cells suspended in a fluid whereby to separate the fluid from the cells comprising flowing the blood product across a surface of a membrane, the membrane having a pore size of less than 0.65 μm, and a smoothness (as herein defined) of less than 0.5 μm and wherein the volume of fluid separated over 15 minutes is greater than 0.6 ml per unit area in $cm^2$ of the said surface when a volume of blood product corresponding to 3.75 ml per unit area in $cm^2$ of the said surface is being treated, and when the transmembrane pressure difference is 35 mbar.

Figure 2A:
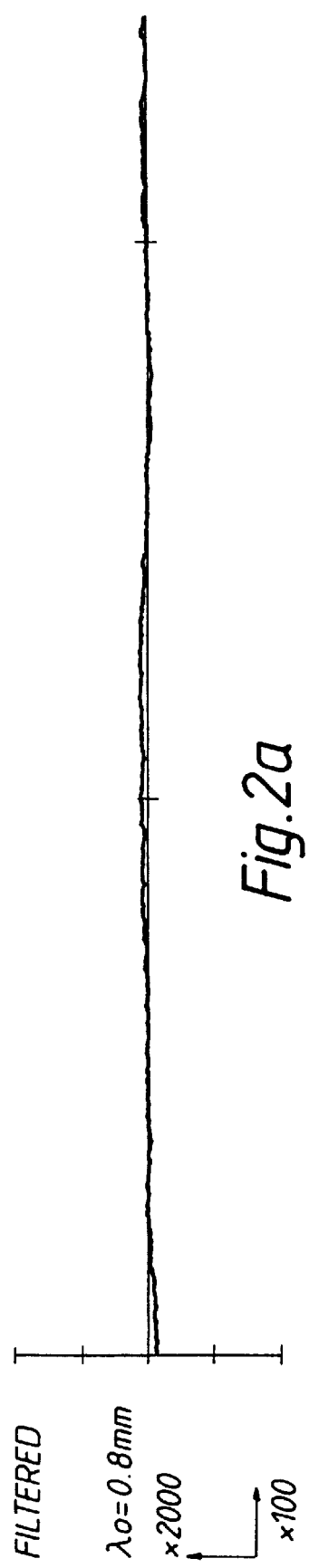
Figure 2B:
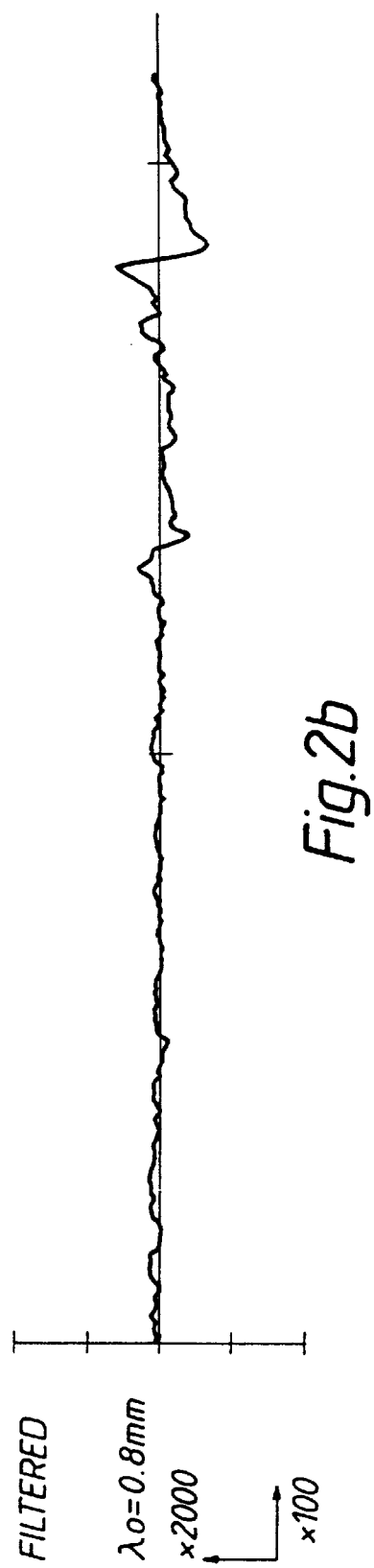
Figure 4:
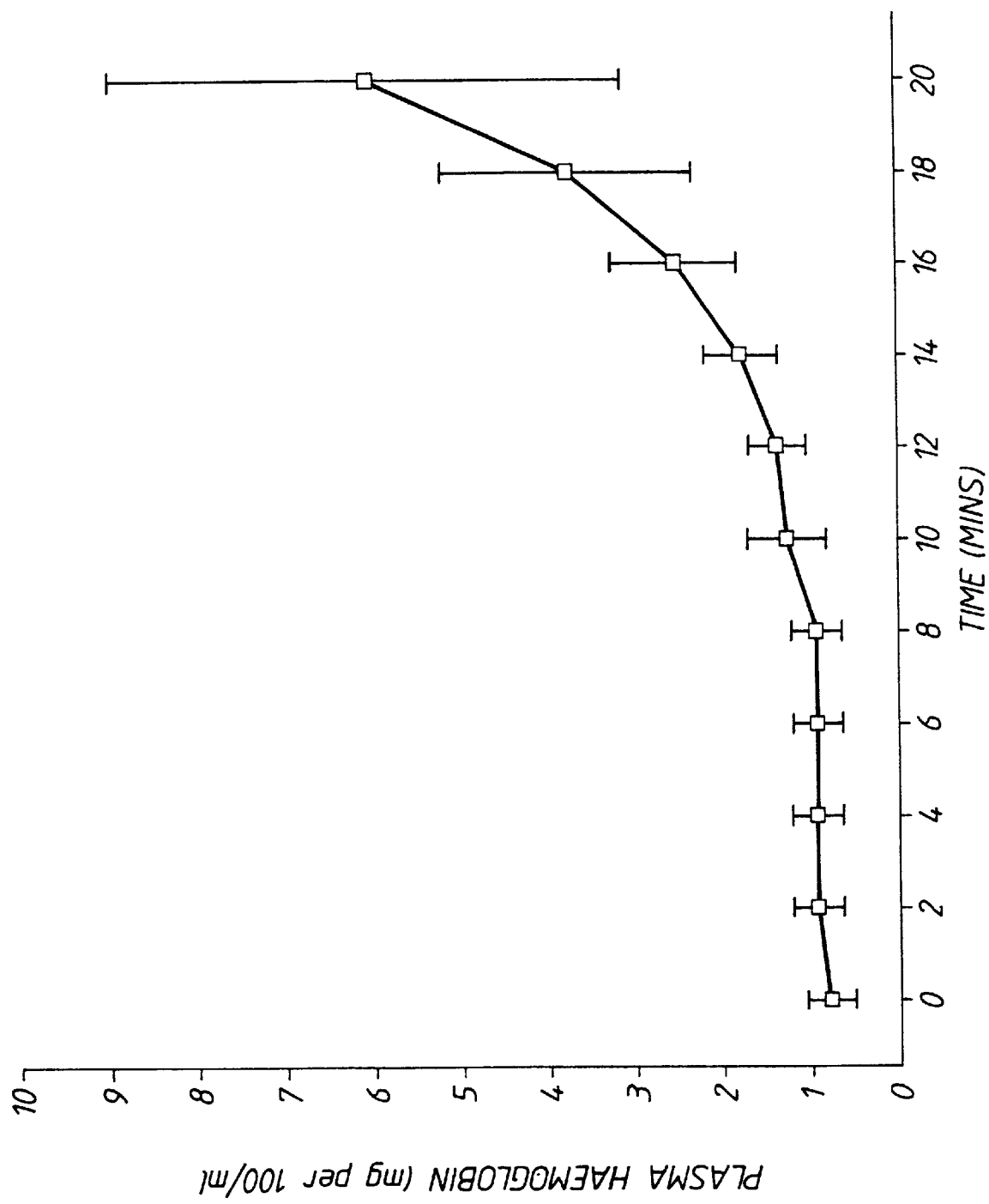

The following is a more detailed description of some embodiments of the invention, by way of example, reference being made to the accompanying drawings in which:

FIG. 1 is a cross-section of a device for separating plasma from blood,

FIG. 2 shows two traces from a Mitutoyo, Surftest 401 surftest machine, the upper trace being the surface trace from a smoother membrane and the lower trace the surface trace of a less smooth membrane, FIG. 3 is a graph plotting against time, firstly plasma flow rate (left hand y-axis) and secondly haematocrit (right hand y-axis) for an example of a blood product filtered through a membrane, FIG. 4 is a graph plotting the amount of haemoglobin in the plasma against time for the Example of FIG. 3.

Referring to FIG. 1, the device comprises a plasma outlet member 10, a manifold 11 and an insert 12.

The plasma outlet member 10 has a generally annual base 13 with a flat upper surface 14. A plasma outlet 15 leads from the centre of this surface 14 and connects with a passage 16 which terminates at an outer surface of the plasma outlet member 10.

The flat upper surface 14 is surrounded by an annular wall 17 which in turn leads to an annular L-shaped rebate 18 extending around the surface 14.

The manifold 11 has an annular body 19 which is co-axial with the axis of the surface 14 and the wall 17 and rebate 18 and is received in the L-shaped rebate 18 and includes an outer axially extending annular surface 20 carrying an annular seal 21 which seals against the axial surface of the L-shaped rebate 18.

The manifold 11 also includes a depending annular flange 22 having an annular outer wall 23 in contact with the annular wall 17 of the plasma outlet member 10.

The manifold 11 includes a blood inlet 24 and a blood outlet 25. The blood inlet 24 includes a passage 26 extending through the body 19 at an angle to the axis of the manifold 11 and leading to a passage 27 which extends through the flange 22 in a direction parallel to the axis of the manifold and which terminates at an outlet 28 adjacent the flat upper surface 14 of the plasma outlet member.

The blood outlet member 25 is formed with an inlet 29 adjacent the flat upper surface 14, a first passage 30 extending through the flange 22 and a second passage 31 extending through the body 19 at an angle relative to the axis of the manifold 11.

The manifold 11 carries the insert 12 which is generally cylindrical in shape and co-axial with the manifold axis with an outer cylindrical wall 32 carrying a seal 33 which contacts an inner annular wall of the manifold 11 to form a seal therebetween. The insert 12 also has a circular head 35 provided with ports 36a,36b. One port 36a extends through the head 35 and is coaxial with the common axis of the manifold 11. This central port 36a is also in alignment with the axis of the plasma outlet 15. The other ports, 36b, are arranged around the junction between the head 35 and the cylindrical wall 34 of the insert 12 and are at an angle to the common axis 37.

A lock nut 38 is in threaded engagement with the outer wall 34 of the insert 12 to allow the gap between the head 35 and the flat upper surface 14 to be adjusted.

An annular seal 39 extends around the outer periphery of the flat upper surface 14 and engages an outer edge of the flange 22—but is separated from an inner edge of the flange 22 as seen in the drawing to provide a flow path therebetween.

In use, the device is disassembled by removing the manifold 11 and the insert 12 from the plasma outlet member 10. An annular disc of membrane material is then placed on the flat inner surface 14 with its axis coaxial with the axis of the plasma outlet 15 such that the membrane surface across which the blood product is to flow is positioned upwards. The diameter of the membrane 40 is such that its outer periphery contacts the inner periphery of the annular seal 39.

The manifold 11 and the insert 12 are then re-engaged with the plasma outlet member 10 and the position of the head 35 relative to the flat inner surface 14 is adjusted to a desired spacing by use of the lock nut 38.

After prewetting of the membrane with saline a blood product is then passed or circulated across the upper surface of the membrane 40; passing from the blood inlet 29 to the blood outlet 28. The pressure gradient across the membrane 40 maintains a flow of plasma or another fluid in which the cells are suspended through the membrane which then leaves via the plasma outlet 15 and the passage 16.

The blood flow can be provided by a peristaltic pump or a syringe pump or may also be provided by the use of air or mechanical pressure applied to a container of blood product.

A known device for testing ultrafiltration membranes is sold by Rhone Poulenc under the trade mark RAYFLOW PLEIADE as a cross flow filtration jig. A housing contains two membranes carried on respective opposite faces of a support. The product to be filtered is flowed across the surfaces of the membranes not contacting the support from respective inlets to respective outlets, and the filtrate is extracted from the support.

It has heretofor been thought that the only significant parameter for a membrane suitable for separating plasma from a blood product is the pore size which, as discussed above, has been required to be small enough to prevent erythrocytes passing through the membrane and to prevent haemolysis. However, as also discussed above, it has been found in previous membranes used for plasma separation and meeting this requirement, that the plasma flow rate is not sufficiently high to make such separation commercially viable.

The separation of plasma from a blood product at useful plasma flux rates and with the avoidance of lysis requires, it is herein postulated, a combination of the smoothness of the membrane surface contacted by the blood product and the structure of the membrane—the structure determining the rate at which a plasma passes through the membrane.

The pore size determines the sizes of particles that will be allowed to pass through the membrane. However, the flow rate of plasma through a membrane is also controlled by the structure of the membrane including internal structure of the pores. Accordingly, it has been found that membranes of different constructions but having the same pore size have differing flow rates.

Flow rate of plasma is important in crossflow plasma separation devices because it is naturally desirable to separate the plasma as rapidly as possible. In addition, a crossflow device is only likely to be commercially acceptable if the processing time for a blood product is no longer than that of a centrifugal separator (for example a haematocrit of 70% in 10–15 minutes).

One accepted measure of the "openness" of the internal structure of a membrane is the "voids volume" (porosity) of the membrane. This is the percentage of the membrane volume which is not occupied by the polymer substrate. The voids volume of membranes can vary from as little as 5% to in excess of 80%.

It has been found, however, that membranes which have high voids volumes (above 50%) and so have acceptable flow rates also have such a tendency to cause lysis when filtering plasma from a blood product, that the quantity of haemoglobin in the plasma is so great as to be unacceptable. It is believed that this is due to the fact that membranes with higher flow rates also have a more "open" surface structure which can provide sites where erythrocytes can be subject to lysis and the release of haemoglobin, and where cellular debris can collect and block the pores.

It is now believed that this problem can be mitigated by increasing the smoothness of the surface of the membrane in contact with the blood product. It is believed that this reduces the incidence of lysis and the collection of cell debris by removing sites on the membrane surface responsible for such effects.

The device described above with reference to FIG. 1 and the RAYFLOW PLEIADE device referred to above were used to perform comparative tests on various different materials for the membrane. In broad terms, the tests were divided into two groups. In the first tests, using the RAYFLOW PLEIADE device, a membrane in accordance with the invention was tested against a commercially available membrane for filtration of blood products and a control membrane. The tests are for demonstrating that, although in both the membrane in accordance with the invention and the commercially available membrane, lysis of the blood product was kept at an acceptably low level, the time-averaged flow rate of plasma per unit area of the membrane was higher in the membrane in accordance with the invention than in the commercially available membrane.

In the second tests, using the device of FIG. 1, a membrane in accordance with the invention was tested against membranes having similar pore sizes and flow rates but having a less smooth surface in contact with the blood product. The purpose of the test was to show that the membranes with less smooth surfaces produce unacceptable lysis.

In these tests, various measurements were used, as follows.

PLASMA FLUX RATE

The average rate of flux of plasma or of another suspending fluid such as SAG-M (PFR) across a membrane is referred to as the plasma flux rate (PFR) and was measured as the volume in milliliters of plasma or fluid (Vp) produced by the device over a set time period (t) in minutes per unit area (A) in $cm^2$ of the membrane being tested. Thus $$PFR = \frac{Vp}{tA} \frac{ml}{min \cdot cm^2}$$

The rate is measured using a set volume ($V_b$) of blood product because as plasma is extracted from the blood product the flow characteristics change so that a time averaged plasma flow rate will be greater from a greater volume of blood product than from a lesser volume of blood product. Additionally it is necessary to define the surface area of the membrane across which the blood product passes as the extraction of plasma will occur faster with a larger surface area.

HAEMOLYSIS

The degree of haemolysis (H) is measured as the content of haemoglobin in the plasma or other cell suspending fluid produced by the device. This can be measured subjectively by a visual inspection of the plasma (which will become increasingly red as the volume of haemoglobin in the plasma increases) or can be measured by known methods in milligrammes of haemoglobin per milliliter of plasma or other fluid. In the former case, the degree of haemolysis) can be expressed either as "−" (meaning no observed haemolysis) to "+++++" (meaning severe haemolysis), with values in between being expressed by from "+" to "++++".

BLOOD PRODUCT

The tests were conducted using a blood product which was either anticoagulated whole blood or blood cells suspended in SAG-M. SAG-M is an aqueous additive solution containing sodium chloride 140 mmol/l, adenine 1.5 mmol/l, glucose 50 mmol/l and mannitol 30 mmol/l. Blood cells (mostly red blood cells) were separated from anticoagulated whole blood by conventional centrifugation techniques and suspended in SAG-M to give a haematocrit value similar to that of whole blood (approximately 45%).

BLOOD VELOCITY

The tests were conducted with the whole blood or the cell suspension in SAG-M pumped through the device by a pump which produces a known flow rate (F) of whole blood or SAG-M through the device. F was measured in meters/second. The blood velocity is a significant parameter because increasing the blood velocity tends to prevent debris from attaching to the membrane surface and so increases PFR.

TRANSMEMBRANE PRESSURE

The transmembrane pressure (P) was maintained at a known level measured in mbar g, which is determined by the blood flow rate through the device and the restrictions on the outlet for the blood product and the plasma outlet.

SMOOTHNESS

The smoothness of a membrane surface was measured using a Mitutoyo Surftest 401 tally surf machine sold by Mitutoyo (UK) Company Limited. In such a machine a stylus is drawn across the surface of the membrane being measured and variations are measured in the position of the stylus in directions normal to the surface. The smoothness of the surface is quantified by an average deviation of the stylus position from a mean position in $\mu$m. When used in this specification, a measurement "smoothness" means a measurement made in this way.

The first group of tests using the RAYFLOW PLEIADE device will now be described. They are designed to demonstrate that a device in accordance with the invention has a superior plasma flux rate (PFR) as compared with another membrane previously used for plasma filtration, even though, in both cases, the degree of lysis was acceptable. A control membrane was also tested.

EXAMPLE 1

Invention

The membrane material used was a 0.2 $\mu$m pore size nylon 66 membrane sold by Pall Corporation under the trade mark ULTIPOR $N_{66}$ and cast on Mylar film as described in U.S. Pat. No. 4,340,479. After casting two pieces of membrane were peeled off the Mylar and heat bonded together in face to face contact with the Mylar cast surface outwards.

The blood product was repeatedly passed through the RAYFLOW PLEIADE device over the course of the experiment—the suspension of cells emerging from the device being recirculated through the pump and back to the device. The other test conditions were as follows:

$V_b$=450 ml
t=15 minutes
A=120 cm$^2$
Blood product=blood cells suspended in SAG-M
Blood velocity (F)=0.33 m/sec
Transmembrane pressure (P)=35 mbar g
The resultant PFR is shown in Table 1 below.

EXAMPLE 2

Control Membrane

The membrane material used was a 0.2 μm pore size nylon 66 membrane sold by Pall Corporation under the trade mark ULTIPOR N$_{66}$ and not cast on a Mylar film. The remaining test conditions were as in Example 1.

The resultant PFR and haemolysis are shown in Table 1 below.

EXAMPLE 3

Prior Art—Known Plasma Separation Membrane

The membrane material used was a commercially available 0.2 μm pore size polycarbonate membrane used for plasma separation. The remaining test conditions were as in Example 1.

The resultant PFR is shown in Table 1 below.

TABLE 1

| EXAMPLE NO. | PFR | VOIDS VOLUME |
| --- | --- | --- |
| 1 | 0.119 | >70% |
| 2 | 0.079 | >70% |
| 3 | 0.036 | <50% |

It will be seen that the membrane of Example 1 had a significantly greater PFR than the membranes of Examples 2 and 3. As noted above, the membrane of Example 1 was a membrane of nylon 66 cast on Mylar and sold by Pall Corporation under the trade mark ULTIPOR. This nylon 66 membrane is characterized by having a comparatively high internal voids volume (70% or greater) and a comparatively high density of surface pores with no substrate. The membrane of Example 3 has a lower voids volume and/or has a comparatively low density of surface pores or has a substrate. These factors tend to reduce significantly the PFR. The membranes produced acceptable levels of lysis with the exception of Example 2 which was used as a control.

It will also be appreciated that the PFR achieved by Example 1 requires only the transmembrane pressure created by blood flow between a stationary membrane and a stationary adjacent surface. The PFR does not rely on the use of increased blood velocities arising from relative motion between the membrane and the adjacent surface, as proposed, for example, in EP-A-464707.

The second group of tests using the device of FIG. 1 will now be described. As mentioned above, they are designed to show that, without a comparatively smooth surface in contact with the blood product, lysis of erythrocytes occurs to an unacceptable extent, even though the flowrate through those membranes is acceptably high.

EXAMPLE 4

The membrane and blood product flow were as described in Example 1. The remaining test conditions were as follows:

Blood product: Anticoagulated Whole blood
t=15 minutes
$V_b$=150 ml
A=49 cm$^2$
Blood Velocity (F)=0.9 m/sec
Transmembrane Pressure (P)=35 mbar g
In addition the smoothness of the membrane was measured as described above. The haemolysis level and smoothness are as shown in Table 2.

EXAMPLE 5

The membrane was a similar membrane to that of Example 4 but having a pore size of 0.45 μm. The remaining conditions were as in Example 4. The haemolysis level and smoothness were as shown in Table 2.

EXAMPLE 6

The membrane of this example was the same as the membrane of Example 2 above. The remaining test conditions were as in Example 4. The haemolysis level and smoothness were as shown in Table 2.

EXAMPLE 7

The membrane of this example was the same as the membrane of Example 6 except having a pore size of 0.45 μm. The remaining test conditions were as in Example 4. The haemolysis level and smoothness were as shown in Table 2.

EXAMPLE 8

The membrane of this example was a hydrophilic polyvinyldifluoride membrane sold by Pall Corporation under the trade mark FLUORODYNE and having a pore size of 0.6 μm. The remaining conditions were as in Example 4. The haemolysis level and smoothness were as shown in Table 2.

EXAMPLE 9

The membrane was a nylon 66 membrane sold by Pall Corporation under the trade mark BIOINERT and having a pore size of 0.8 μm. The remaining conditions were as in Example 4. The haemolysis level and smoothness were as shown in table 2.

TABLE 2

| EXAMPLE NO. | HAEMOLYSIS | SMOOTHNESS (μm) |
| --- | --- | --- |
| 4 | – | 0.2–0.22 |
| 5 | +/– | 0.2–0.22 |
| 6 | +++ | 1.0–1.9 |
| 7 | ++++ | 1.0–1.9 |
| 8 | ++++ | 0.95–1.45 |
| 9 | +++++ | 1.0–1.9 |

As seen from Table 2, the degree of haemolysis is much lower with the membranes of Examples 4 and 5 than with the membranes of Examples 6 to 9. It is believed that this is due to the fact that the smoother surface of these membranes prevents lysis of erythrocytes and consequently reduces the release of haemoglobin. It will be recalled that the membrane of Example 6 is the "Control Membrane" of Example 2 and it will be seen from these Examples that, although such a membrane has a high PFR, its use causes an unacceptable lysis of erythrocytes. It will also be seen that increasing the pore size does not reduce the haemolysis but rather increases the haemolysis. It is believed that this is due to the fact that the increase in pore size provides sites where erythrocytes can enter the membrane and be damaged causing lysis and releasing haemoglobin. It has been found that, in general, membranes with pore sizes above 0.65 μm cannot be used for separating plasma from a blood product because, above such a pore size, the pores are sufficiently large to permit such entry of erythrocytes. Smaller pore sizes prevent such entry.

Further tests have been conducted using the device described above with reference to FIG. 1 in order specifically to confirm the effect of the smoother surface on the PFR and haemolysis.

EXAMPLE 10

In this example, the membrane was a nylon 66 membrane sold by Pall Corporation under the trade mark ULTIPOR $N_{66}$ and cast on Mylar in accordance with U.S. Pat. No. 4,340,479. The pore size was 0.45 μm. The other test conditions were as in Example 4. Only one face of the membrane was cast in contact with the Mylar film; the other face was not so cast. From such a membrane, two samples were prepared. The first (SAMPLE 1) was formed by bonding two pieces of the membrane in face-to-face contact with the Mylar cast surfaces in contact. The second (SAMPLE 2) was formed by bonding two pieces of the membrane in face-to-face contact with the Mylar cast surfaces outwards. SAMPLE 1 and SAMPLE 2 were then used for separating plasma from blood product as described above with reference to Example 1 using the same conditions as in Example 1.

FIG. 2 shows the traces from a Mitutoyo Surftest machine for the SAMPLE 1 and SAMPLE 2. The upper trace is of SAMPLE 2 and the lower trace is of SAMPLE 1. It will be seen that SAMPLE 2 is smoother than SAMPLE 1. The maximum measured deviation for the Mylar cast side was 0.27 μm and for the non-Mylar cast side 0.47 μm.

Four further samples (SAMPLES 3–6) were also prepared, SAMPLES 3 and 5 in the same way as SAMPLE 1 and SAMPLES 4 and 6 in the same way as SAMPLE 2. SAMPLES 1–6 were then tested using the device described above with reference to FIG. 1 of the drawings.

Two different samples (No. 1 and No. 2) of anticoagulated whole blood were used. Blood sample No. 1 was tested with a single sample of the membrane described above and blood sample No. 2 was tested with two different samples of the membrane described.

The results are as shown in Table 3.

TABLE 3

| BLOOD SAMPLE No. | MEMBRANE SAMPLE No. | PFR | H (mg Haemoglobin/ml plasma) |
| --- | --- | --- | --- |
| 1 | 1 | 0.112 | 0.16 |
| 1 | 2 | 0.147 | 0.04 |
| 2 | 3 | 0.101 | 0.22 |
| 2 | 4 | 0.150 | 0.01 |
| 2 | 5 | 0.106 | 0.21 |
| 2 | 6 | 0.157 | 0.02 |

As shown in Table 3, all three membranes with the Mylar cast surfaces outwards had higher flow rates and lower haemolysis than the membrane with Mylar cast surfaces in contact. This tends to confirm the results set out above.

In addition, Example 10 demonstrates the contribution of smoothness to PFR. In this regard, it will be appreciated that PFR is a time averaged rate and that, as plasma is extracted from a blood product so raising the haemocrit, the instantaneous plasma flow rate drops (because there is less plasma to be extracted from the product).

This instantaneous flow rate is also affected by any blockage of the pores of the membrane. Such blockage will occur because of cell debris and other large particles being trapped in the membrane pores. It will be seen from Table 3 that, although, of course, SAMPLE 1 and SAMPLE 2 have the same water flow rate (i.e. the rate at which clean water will flow through the membrane regardless of the time of flow), the non-Mylar cast surfaces have a lower PFR than the Mylar cast surfaces.

It is believed that this is because decreasing the smoothness may provide sites where erythrocytes may lodge and subsequently lyse and where cell debris and other particles can lodge, so allowing particles to accumulate over a period of time and so causing gradual blockage of the membrane pores.

This tendency to blockage in membranes with less smooth surfaces can, if the smoothness is decreased even further (beyond 0.5 μm), prevent their use for extracting plasma from a blood product on a practical scale. An acceptable level of plasma extraction is such that the haematocrit of the blood product is raised to 70% in as short a possible time. An acceptable time may be measured against the time taken to achieve similar plasma separation using a centrifuge.

To produce a haematocrit of 70% in a blood product (as typically required in the processing of blood products) a centrifuge might typically take a minimum 30 minutes and so the use of a membrane will be beneficial if such a haematocrit can be achieved in a similar or lesser time.

The smooth surface membranes (SAMPLES 2, 4 and 6) of Example 10 were able to achieve a haematocrit of 70% in less than 10 minutes.

EXAMPLE 11

The following further test was conducted to confirm these conclusions. The device described above with reference to FIG. 1 was used with the membrane of Example 1 to filter 150 ml of fresh whole blood anticoagulated with CPDA under the conditions of blood velocity and transmembrane pressure of Example 1. The PFR, haematocrit of the blood and the haemolysis (in mg haemoglobin per 100 ml of plasma) were measured at 2 minute intervals for a period of 20 minutes. The test was repeated 10 times and for each parameter the mean and ±1 standard deviations were calculated for each time interval.

The results are shown in FIG. 3 (which plots PFR and haematocrit against time) and FIG. 4 (which plots the haemoglobin in the filtered plasma against time).

It will be seen from FIG. 3, that, in the exemplified embodiment of the invention, the PFR is closely dependent on the haematocrit of the blood product. As the haematocrit rises (i.e. as the concentration of red cells rises) the plasma flux decreases proportionately. This indicates that the drop in PFR with time is mainly due to plasma extraction and red cell concentration and not to fouling of the membrane or other factors causing a deterioration in membrane performance.

FIG. 4 shows that haemolysis does not begin to increase significantly until 12 minutes have elapsed. With reference to FIG. 3, it will be seen that after 12 minutes a haematocrit of more than 70% has been reached and, as discussed above, a haematocrit of 70% is generally regarded as an acceptable level.

Although the haemoloysis increases significantly after 12 minutes, it is believed that this is due not to the membrane but to the fact that the shear forces to which the erythrocytes are subjected increase as the viscosity of the blood increases as plasma is removed and the haematocrit rises. In addition, after 12 minutes, the blood has been in contact with the surfaces of the device for a considerable time which also tends to increase lysis as does the action of the pump in pumping the red cells at high haematocrits.

It is considered that membrane materials embodying the invention and as described above are less likely to activate platelets.

While the membranes described above have been tested using exemplified cross-flow filtration devices, it will be appreciated that they may be used with any suitable device, which may not be a cross-flow device.

We claim:

1. A cross-flow device for separating a blood product comprising red cells suspended in a fluid into a separated red cell-depleted fluid and a separated fluid comprising red cells, the device including:
   a manifold having an inlet for said blood product and an outlet for said separated fluid comprising red cells;
   an outlet for said separated red cell-depleted fluid: and
   a membrane extending across the manifold to one side of said blood product inlet and said outlet for said separated fluid comprising red cells;
   the membrane having a first surface and a second surface, the first surface facing the manifold and contacted by said blood product flowing between the blood product inlet and the outlet for said separated fluid comprising red cells;
   the membrane having a voids volume of at least about 50% and the first surface having a smoothness of less than about 0.5 $\mu$m as measured by a Mitutoyo Surftest 401 tally surf machine as the average deviation in directions normal to said first surface of the position of a stylus of said machine from a mean position of the stylus as the stylus is drawn across said first surface;
   said outlet for said separated red cell-depleted fluid downstream of said second membrane surface.

2. The device according to claim 1 wherein the voids volume of the membrane is at least about 70%.

3. The device according to claim 1 wherein the membrane has a pore size of less than about 0.65 $\mu$m.

4. The device according to claim 3 wherein the pore size of the membrane is less than about 0.5 $\mu$m.

5. The device according to claim 1, wherein the volume of said separated red cell-depleted fluid separated over 15 minutes is greater than about 0.6 ml per unit area in cm$^2$ of the first surface when the device is used to treat a volume corresponding to 3.75 ml per unit area in cm$^2$ of the first surface of said blood product, when said blood product comprises red cells suspended in an aqueous solution including about 140 mmol/l sodium chloride, about 1.5 mmol/l adenine, about 50 mmol/l glucose and about 30 mmol/l mannitol at a hematocrit of about 45%, and when the transmembrane pressure difference is about 35 mbar.

6. The device according to claim 5 wherein the volume of said separated red cell-depleted fluid separated per unit area in cm$^2$ of said first surface in 15 minutes is greater than about 1.2 ml when the device is used to treat a volume corresponding to 3.75 ml per unit area in cm$^2$ of the first surface of said blood product, when said blood product comprises red cells suspended in an aqueous solution of 140 mmol/l sodium chloride, 1.5 mmol/l adenine, 50 mmol/l glucose and 30 mmol/l mannitol at a hematocrit of 45%, and when the transmembrane pressure difference is 35 mbar.

7. The device of claim 6 wherein the volume of said separated red cell-depleted fluid per unit area in cm$^2$ of the first surface in 15 minutes is greater than 1.5 ml.

8. The device of claim 7 wherein the volume of said separated red cell-depleted fluid per unit area in cm$^2$ of the first surface in 15 minutes is greater than 2.25 ml.

9. The device according to claim 1 wherein the smoothness of the first membrane surface is less than about 0.3 $\mu$m.

10. The device according to claim 1 wherein the membrane comprises a skinless alcohol-insoluble hydrophilic polyamide resin.

11. The device according to claim 10 wherein the polyamide comprises nylon 66, said first membrane surface having been cast on a Mylar substrate.

12. The device according to claim 11 wherein the membrane comprises two sheets of 0.45 $\mu$m pore size nylon 66 membrane, each sheet having been cast on said Mylar substrate and removed from said Mylar substrate, the two sheets being bonded together in face-to-face contact with the Mylar cast sides outward to form said first and second membrane surfaces.

13. The device according to claim 1 comprising a fluid outlet member having a flat upper surface on which said second surface of the membrane rests, the outlet for said separated red cell-depleted fluid leading through said upper surface; and means defining a passage for the blood product from said blood product inlet to the outlet for said separated fluid comprising red cells across the first surface of the membrane.

14. The device according to claim 13 wherein a wall surrounds said surface of the fluid outlet member, the manifold comprising an annular flange which fits within said wall.

15. The device according to claim 14 wherein the passage defining means comprises an insert having a surface spaced from the first surface of the membrane, the insert being carried by the manifold.

16. The device according to claim 15 wherein said passage defining means is capable of providing for adjustable spacing.

17. The device according to claim 15 wherein the will is annular, the manifold is annular and the insert surface is circular.

18. The device according to claim 17 wherein the fluid outlet member includes an annular rebate, the manifold including an annular body received in said rebate with said annular flange depending therefrom.

19. The device according to claim 18 wherein the manifold has an annular central bore, the insert being received in said bore.

20. The device according to claim 19 wherein a fire seal is provided between the rebate and the manifold and a second seal is provided between the bore and the insert.

21. A cross-flow device for separating a blood product comprising red cells suspended in a fluid into a separated red cell-depleted fluid and a separated fluid comprising red cells, the device comprising:
   a housing having an inlet for the blood product, an outlet for the separated fluid comprising red cells and an outlet for the separated red cell-depleted fluid; and
   a substantially planar membrane disposed in the housing;
   the membrane having a first surface and a second surface, the first surface facing the housing and contacted by the blood product flowing between the blood product inlet and the outlet for the separated fluid comprising red cells;

the outlet for the separated red cell-depleted fluid downstream of said second membrane surface;

the membrane having a pore size of less than about 0.65 µm; and wherein the volume of said separated red cell-depleted fluid separated over 15 minutes is greater than 0.6 ml per unit area in cm² of the first surface when the device is used to treat a volume corresponding to 3.75 ml per unit area in cm² of the first surface of said blood product, when said blood product comprises red cells suspended in an aqueous solution of 140 mmol/l sodium chloride, 1.5 mmol/l adenine, 50 mmol/l glucose and 30 mmol/l mannitol at a hematocrit of 45%, and when the transmembrane pressure difference is 35 mbar;

the first membrane surface having a smoothness of less than about 0.5 µm as measured by a Mitutoyo Surftest 401 tally surf machine as the average deviation in directions normal to said first surface of the position of a stylus of said machine from a mean position of the stylus as the stylus is drawn across said first surface.

22. The device according to claim 21 wherein the volume of said separated red cell-depleted fluid separated per unit area in cm² of said first surface in 15 minutes is greater than 1.2 ml when the device is used to treat a volume corresponding to 3.75 ml per unit area in cm² of the first surface of said blood product, when said blood product comprises red cells suspended in an aqueous solution of 140 mmol/l sodium chloride, 1.5 mmol/l adenine, 50 mmol/l glucose and 30 mmol/l mannitol at a hematocrit of 45%, and when the transmembrane pressure difference is 35 mbar.

23. The device according to claim 21 wherein the pore size of the membrane is less than about 0.5 µm.

24. The device according to claim 21 wherein the smoothness of the first membrane surface is less than about 0.3 µm.

25. The device according to claim 21 wherein the membrane comprises a skinless alcohol-insoluble hydrophilic polyamide resin.

26. The device according to claim 25 wherein the polyamide comprises nylon 66, said first membrane surface having been cast on a Mylar substrate.

27. The device according to claim 26 wherein the membrane comprises two sheets of 0.45 µm pore size nylon 66 membrane, each sheet having been cast on a Mylar substrate and then removed from said Mylar substrate, the two sheets being bonded together in face-to-face contact with the Mylar cast sides outward to form said first and second surfaces.

28. The device according to claim 21 comprising a fluid outlet member having a flat upper surface on which the second surface of the membrane rests, the outlet for the red cell-depleted fluid leading through said upper surface, a manifold providing said inlet for the blood product and said outlet for the separated fluid comprising red cells, and means defining a passage for the blood product from said blood product inlet to the outlet for the separated fluid comprising red cells across the first membrane surface.

29. The device according to claim 28 wherein a wall surrounds said surface of the fluid outlet member, the manifold comprising an annular flange which fits within said wall.

30. The device according to claim 29 wherein the passage defining means comprises an insert having a surface spaced from the first surface of the membrane, the insert being carried by the manifold.

31. The device according to claim 30 wherein said passage defining means provides for adjustable spacing.

32. The device according to claim 30 wherein the wall is annular, the manifold is annular and the insert surface is circular.

33. The device according to claim 32 wherein the fluid outlet member includes an annular rebate, the manifold including an annular body received in said rebate with said annular flange depending therefrom.

34. The device according to claim 33 wherein the manifold has an annular central bore, the insert being received in said bore.

35. The device according to claim 34 wherein a first seal is provided between the rebate and the manifold and a second seal is provided between the bore and the insert.

36. A method of separating a blood product comprising red cells suspended in a fluid into a separated red cell-depleted fluid and a separated fluid comprising red cells using a substantially planar membrane having first and second surfaces comprising:

flowing the blood product across the first surface of the membrane;

passing separated red cell-depleted fluid through the first and second surfaces of the membrane; and passing separated fluid comprising red cells across the first surface of the membrane;

the membrane having a voids volume of at least about 50% and the first surface having a smoothness of less than about 0.5 µm as measured by a Mitutoyo Surftest 401 tally surf machine as the average deviation in directions normal to said first surface of the position of a stylus of said machine from a mean position of the stylus as the stylus is drawn across said first surface.

37. The method according to claim 36 wherein the voids volume of the membrane is at least about 70%.

38. The method according to claim 36 wherein the membrane has a pore size of less than about 0.65 µm.

39. The method according to claim 38 wherein the pore size is less than about 0.5 µm.

40. The method according to claim 36 wherein the volume of said separated red cell-depleted fluid separated over 15 minutes is greater than 0.6 ml per unit area in cm² of the first surface when a volume of blood product corresponding to 3.75 ml per unit area in cm² of the first surface is being treated, and when the transmembrane pressure difference is 35 mbar.

41. The method according to claim 40 wherein the volume of separated red cell-depleted fluid per unit area in cm² of said first surface in 15 minutes is greater than 1.2 ml when a volume of blood product corresponding to 3.75 ml per unit area in cm² of said first surface is being treated, and when the transmembrane pressure difference is 35 mbar.

42. The method according to claim 41 wherein the volume of said separated red cell-depleted fluid per unit area in cm² of the first surface in 15 minutes is greater than 1.5 ml.

43. The method according to claim 42 wherein the volume of said separated red cell-depleted fluid per unit area in cm² of the first surface in 15 minutes is greater than 2.25 ml.

44. The method according to claim 36 wherein the smoothness of the first membrane surface is less than about 0.3 µm.

45. The method according to claim 36 wherein the membrane comprises a skinless alcohol insoluble hydrophilic polyamide membrane.

46. The method according to claim 45 wherein the polyamide comprises nylon 66, said first membrane surface having been cast on a Mylar substrate.

47. The method according to claim 46 wherein the membrane comprises two sheets of 0.45 µm pore size nylon 66 membrane, each sheet having been cast on a Mylar substrate and then removed from said Mylar substrate, the two sheet being bonded together in face-to-face contact with the Mylar cast sides outward to form said first and second surfaces.

48. The method according to claim 36 wherein the blood product comprises red cells suspended in an aqueous solution of about 140 mmol/l sodium chloride, about 1.5 mmol/l adenine, about 50 mmol/l glucose and about 30 mmol/l mannitol.

49. The method according to claim 48 wherein the hematocrit of the red cells in the blood product is greater than about 30%.

50. The method according to claim 36 wherein the blood product comprises anticoagulated fresh whole blood.

51. The method according to claim 50 comprising flowing said blood product across the first membrane surface until a hematocrit of about 70% is reached.

52. A method of separating a blood product comprising red cells suspended in a fluid into a separated red cell-depleted fluid and a separated fluid comprising red cells using a substantially planar membrane having first and second surfaces comprising:

flowing the blood product across the first surface of the membrane;

the membrane having a pore size of less than about 0.65 $\mu$m and the first surface having a smoothness of less than about 0.5 $\mu$m as measured by a Mitutoyo Surftest 401 tally surf machine as the average deviation in directions normal to said first surface of the position of a stylus of said machine from a mean position of the stylus as the stylus is drawn across said first surface, and wherein the volume of fluid separated over 15 minutes is greater than 0.6 ml per unit area in $cm^2$ of the first surface when a volume of blood product corresponding to 3.75 ml per unit area in $cm^2$ of the first surface is being treated, and when the transmembrane pressure difference is 35 mbar.

53. The method according to claim 52 wherein the volume of said separated red cell-depleted fluid separated per unit area in $cm^2$ of said first surface in 15 minutes is greater than 1.5 ml when a volume of blood product corresponding to 3.75 ml per unit area in $cm^2$ of the first surface is being treated, and when the transmembrane pressure difference is 35 mbar.

54. The method according to claim 52 wherein the pore size of said membrane is less than about 0.5 $\mu$m.

55. The method according to claim 52 wherein the smoothness of the first membrane surface is less than about 0.3 $\mu$m.

56. The method according to claim 52 wherein the membrane comprises a skinless alcohol insoluble hydrophilic polyamide membrane.

57. The method according to claim 56 wherein the polyamide comprises nylon 66, said first membrane surface having been cast on a Mylar substrate.

58. The method according to claim 57 wherein the membrane comprises two sheets of 0.45 $\mu$m pore size nylon 66 membrane, each sheet having been cast on a Mylar substrate and then removed from said Mylar substrate, the two sheets being bonded together in face-to-face contact with the Mylar cast sides outward to form said first and second surfaces.

59. The method according to claim 52 wherein the blood product comprises red cells suspended in an aqueous solution of about 140 mmol/l sodium chloride, about 1.5 mmol/l adenine, about 50 mmol/l glucose and about 30 mmol/l mannitol.

60. The method according to claim 59 wherein the hematocrit of the red cells in the blood product is greater than about 30%.

61. The method according to claim 52 wherein the blood product comprises anticoagulated fresh whole blood.

62. The method according to claim 61 comprising flowing said blood product across the first membrane surface until a hematocrit of about 70% is reached.

* * * * *